United States Patent
Tamura

Patent Number: 5,940,407
Date of Patent: Aug. 17, 1999

[54] VOICE BAND SIGNAL CELL ASSEMBLY APPARATUS FOR ATM

[75] Inventor: Kazunori Tamura, Tokyo, Japan

[73] Assignee: Mitsubishi Denki Kabushiki Kaisha, Tokyo, Japan

[21] Appl. No.: 08/780,937

[22] Filed: Jan. 10, 1997

[30] Foreign Application Priority Data

May 31, 1996 [JP] Japan .................................. 8-138649

[51] Int. Cl.⁶ ...................................................... H04J 1/02
[52] U.S. Cl. ........................................... 370/493; 370/474
[58] Field of Search ................................... 370/474, 230, 370/389

[56] References Cited

U.S. PATENT DOCUMENTS

| 5,243,438 | 9/1993 | Anderton et al. .................. 370/94.1 |
| 5,654,964 | 8/1997 | Wake ................................... 370/474 |

FOREIGN PATENT DOCUMENTS

| 4157843 | 5/1992 | Japan . |
| 4249446 | 9/1992 | Japan . |

*Primary Examiner*—Jeffery A. Hofsass
*Assistant Examiner*—Mitchell Slavitt
*Attorney, Agent, or Firm*—Rothwell, Figg, Ernst & Kurz

[57] ABSTRACT

A discriminating section determines whether a voice band signal is "voice" or "data". When the voice band signal is voice, a voice detector detects the presence or absence of voice in the signal. If silence is detected, a cell assembly section prohibits transmission of cells. In the meantime, when the voice band signal is data, a carrier detector detects the presence or absence of a carrier. A cell assembly section sends out a cell in response to the presence of the carrier in the input signal, while prohibiting the cell transmission when no carrier is detected in the input signal. The apparatus reduces the number of cells transmitted and achieves a high transmission efficiency.

9 Claims, 10 Drawing Sheets

$\cdots, X_{\ell-2}, X_{\ell-1}, \underbrace{X_{\ell}, X_{\ell+1}, X_{\ell+2}, \cdots, X_{\ell+N-1}}_{\text{N DATA}}, X_{\ell+N}, X_{\ell+N+1}, \cdots$

Fig. 4

INPUT SIGNAL $\cdots, \underline{Y_{L-1}}, \underline{Y_L}, \underline{Y_{L+1}}, \cdots, \underline{Y_{M-1}}, \underline{Y_M}, \underline{Y_{M+1}}, \cdots$ CARRIER PRESENCE/ABSENCE DETECTION RESULT: ⇓ ⇓ ⇓ ⇓   ⇓ ⇓ ⇓
ABSENT  ABSENT  PRESENT  PRESENT   PRESENT  ABSENT  ABSENT CELL ASSEMBLY INFORMATION $\cdots, Y_{L-1}, \boxed{Y_L, Y_{L+1}, \cdots, Y_{M-1}}, Y_M, Y_{M+1}, \cdots$

INCORPORATE INTO CELL

Fig. 5

VOICE BAND SIGNAL CELL ASSEMBLY APPARATUS FOR ATM

BACKGROUND OF THE INVENTION

1. Field of the Invention

The present invention relates to a voice band signal cell assembly apparatus for use in ATM (Asynchronous Transfer Mode). The apparatus is capable of attaining a high transmission efficiency by reducing the number of cells formed in the voice CLAD (Cell Assembly and Diassembly) for ATM.

2. Description of the Prior Art

FIG. 1 is a block diagram illustrating a structure of a conventional cell assembly apparatus used for transmitting voice band signals in ATM. A voice band signal is divided into "voice" and "data". It should be noted that "data" refers to a signal produced by modulating a carrier so as to transmit data, such as digital data, by using the voice band.

FIG. 1 includes a voice detector 1, a high efficiency voice encoder 2, and a cell assembly section 3, which form a structure for assembling voice into cells. Such a structure has been disclosed in Japanese Patent Laid-Open Publication Nos. 4-157843 and 4-249446. If the voice band input signal is voice, then the high efficiency voice encoder 2 compresses the band of the voice signal and supplies the compressed voice signal to the cell assembly section 3. Assuming that a 64 kbps PCM signal is encoded into a 16K LD-CELP (ITU-T Rec. G. 728) signal with this compression efficiency, the signal band is then compressed to ¼ of the original signal.

The voice signal is also input to the voice detector 1, where the presence or absence of voice in the voice signal is detected. In accordance with the detection result, the cell assembly section 3 forms the encoded voice signal into a cell, and sends the cell out onto an ATM transmission channel only when the voice detector 1 detects the presence of voice. Since about 40% of the voice signal has voice information (with 60% constituting periods of silence), a compression efficiency of about ½ is achieved by detecting the absence of voice. The total voice compression is about ⅛.

In the meantime, a cell assembly section 4 assembles data into cells. That is, if the voice band input signal is data, the data is input directly to the cell assembly section 4 and formed into cells. The cells are then sent out onto the ATM transmission channel.

Note that it is a discriminating section (I) 5 of FIG. 2 that determines whether the voice band input signal is voice or data. The discriminating section (I) 5 can be implemented by a technology such as the one recommended in ITU-T Rec. G. 763. Also note that a discriminating section (II) 6 of FIG. 2 is implemented by simply adding to the discriminating section (I) 5 a function to determine whether the data is a specific modulated wave or a modulated wave other than the specific modulated wave. The data of the specific modulated wave refers to data such as a G3 facsimile signal including a tone signal.

An advantage of such a conventional cell assembly apparatus for ATM is a high transmission efficiency achieved by way of high efficiency voice compression and compression of the silence parts in the signal, when the voice band input signal is voice. However, when the voice band input signal is supplied in the form of data, such as a G3 facsimile signal, the voice band input signal is input directly to the cell assembly section, and the voice band signal is not compressed. It is thus necessary to provide a wide band transmission channel for transmitting the voice band signal in the form of a cell. This is inconvenient because overall transmission efficiency is deteriorated.

SUMMARY OF THE INVENTION

The present invention is made to solve the above problem and aims to provide a voice band signal cell assembly apparatus for ATM which is capable of achieving a high transmission efficiency in transmitting a voice band input signal supplied as data as well as voice.

A cell assembly apparatus for a voice band signal used in ATM according to the present invention comprises: a discriminating section for determining whether an incoming voice band signal is voice or data; a high efficiency voice encoder for compressing a band of the voice when the discriminating section determines that the voice band signal is voice; a voice detector for detecting the presence or absence of voice in the voice band signal; a cell assembly section dedicated to voice for prohibiting supply of a cell when the voice detector detects the absence of voice in the voice band signal; a carrier detector for detecting the presence or absence of a carrier including a tone signal when the discriminating section determines that the voice band signal is data; and a cell assembly section dedicated to data for prohibiting supply of a cell when the carrier detector detects the absence of the carrier.

The apparatus achieves a high transmission efficiency of the voice band input signal supplied as voice by way of compressing the voice signal band by the encoder and prohibiting the cell assembly of the silence parts of the voice signal. Also, when the voice band input signal is data and the carrier detector detects no carrier in the data signal, no cell is sent out. Such a band compression based on the presence or absence of the carrier contributes to achieving a high cell assembly transmission efficiency.

In one aspect of the present invention, a cell assembly apparatus for a voice band signal used in ATM includes an encoder provided on an input side of the data cell assembly section. When the discriminating section determines that voice band signal is data, the encoder compresses the data. By placing the encoder on the input side of the data cell assembly section, it is possible to further suppress the number of cells to be assembled.

Preferably, the encoder for compressing the data band in the cell assembly apparatus for a voice band signal used in ATM is a voice encoder which enables transmission of desired data. This means that the encoder is provided not only for the compression of data, but also for the compression of voice. This reduces the types of encoders used, and contributes to a simplified structure of the apparatus.

It is also preferable that in the cell assembly apparatus for a voice band signal used in ATM, the high efficiency encoder used for compression of the voice is combined with the encoder used for compression of the data. At the same time, two cell assembly sections dedicated to voice and data, respectively, are integrated into one component. Thus, it is possible to further simplify the structure of the apparatus.

In another aspect of the present invention, a cell assembly apparatus for a voice band signal used in ATM includes a discriminating section having a function to determine whether the data is a specific modulated wave or a modulated wave other than the specific modulated wave. The apparatus also includes a demodulator provided on an input side of the data cell assembly section. When the discriminating section determines that the voice band signal is data of the specific modulated wave, the demodulator retrieves a baseband signal of the data of the specific modulated wave. That is, the input signal is reconstituted to the baseband signal prior to assembling into cells. Thus, the cell transmission can be carried out with a high transmission efficiency close to an ideal efficiency.

Preferably, the cell assembly apparatus for a voice band signal used in ATM includes a buffer circuit provided between the cell assembly section and the demodulator. The buffer circuit has a capacity defined based on a demodulated signal length and a maximum deviation of a clock frequency of a demodulated signal relative to network clock frequency, and relieves an asynchronous state between a clock frequency of a demodulated signal and a network clock frequency. The buffer circuit is controlled by the carrier detector. Thus, the apparatus carries out the cell assembly and transmission of the demodulated signal with a simple structure.

It is also preferable that the cell assembly apparatus for a voice band signal used in ATM includes a stuffing circuit provided between the data cell assembly section and the demodulator. The stuffing circuit relieves an asynchronous state between a clock frequency of a demodulated signal and a network clock frequency. The stuffing circuit and the data cell assembly section are controlled by the carrier detector. It is possible to establish communication even if the demodulating clock frequency is asynchronous to the network clock frequency. In addition, the apparatus minimizes a delay during the assembly of cells and achieves a very reliable cell transmission.

It is also preferable that the cell assembly apparatus for a voice band signal used in ATM includes a clock frequency difference detector provided between the data cell assembly section and the demodulator. The clock frequency difference detector receives information about the clock difference between a clock frequency of a demodulated signal and a network clock frequency, and relieves an asynchronous situation between those two clock frequencies. The data cell assembly section has a function to transmit the clock difference information by placing the information in a header of an ATM adaptation layer of a cell. This improves the performance of reproducing the demodulated clock frequency at the receiver side.

In still another aspect of the present invention, a data cell assembly apparatus for a voice band signal used in ATM consists of two data cell assembly sections dedicated to data. One data cell assembly section receives an output of the carrier detector and a data signal demodulated by the demodulator, while the other data cell assembly section receives an output of the carrier detector and a non-demodulated data signal. When the input signal is the data of the specific modulated wave, the data is demodulated before assembling the data into a cell by the former data cell assembly section. When the input signal is the data of the modulated wave other than the specific modulated wave, the latter cell assembly section assembles the data into a cell without demodulating it. The apparatus can transmit all the data within the voice band, while attaining a high transmission efficiency close to an ideal efficiency in the transmission of the data such as the G3 facsimile signal which is a specific modulated wave.

Further, a voice band cell assembly apparatus for ATM according to the present invention, which assembles and transmits cells from the data consisting of voice band signals, comprises: a carrier detector for detecting the presence or absence of the carrier in the data; and the cell assembly section for assembling and transmitting cells from the data having the carrier in accordance with the detection result of the carrier detector. The apparatus reduces the number of cells formed from the data.

BRIEF DESCRIPTION OF THE DRAWINGS

A preferred embodiment of the present invention will be described below in conjunction with the following drawings wherein:

FIG. 4 illustrates a data signal sequence input to a carrier detector in the apparatus shown in FIG. 3;

FIG. 5 illustrates how a cell assembly section of FIG. 3 forms cells; and

DESCRIPTION OF THE PREFERRED EMBODIMENTS

Embodiment 1

Figure 3:
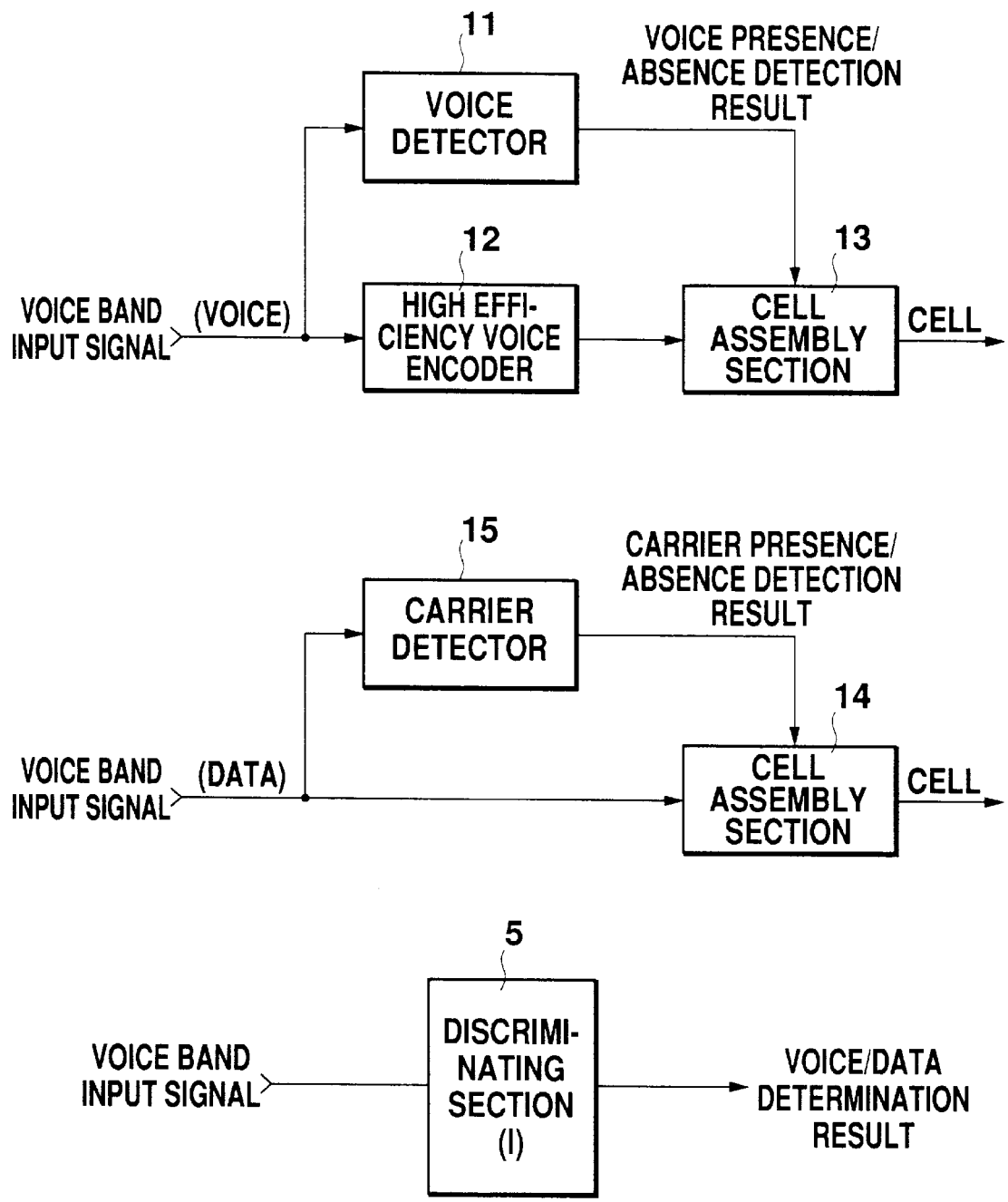
FIG. 3 is a block diagram illustrating a voice band cell assembly apparatus for ATM according to a first embodiment of the present invention.

FIG. 3 shows an ATM (Asynchronous Transfer Mode) voice band signal cell assembly apparatus according to a first embodiment of the present invention.

A discriminating section (I) 5 determines whether a voice band input signal is "voice" or "data". As mentioned in the above, note that the voice band signal consists of "voice" and "data", in which "data" represents a signal produced by modulating a carrier for transmitting digital data using the voice band. The discriminating section (I) 5 is constituted based on the technology recommended in ITU-T Rec. G. 763. In accordance with a determination made by the discriminating section (I) 5, an input signal is divided into "voice" and "data" by a signal dividing means (not shown). "Voice" is input to a voice detector 11 and a high efficiency voice encoder 12, while "data" is input to a carrier detector 15 and a cell assembly section 14.

Figure 1:
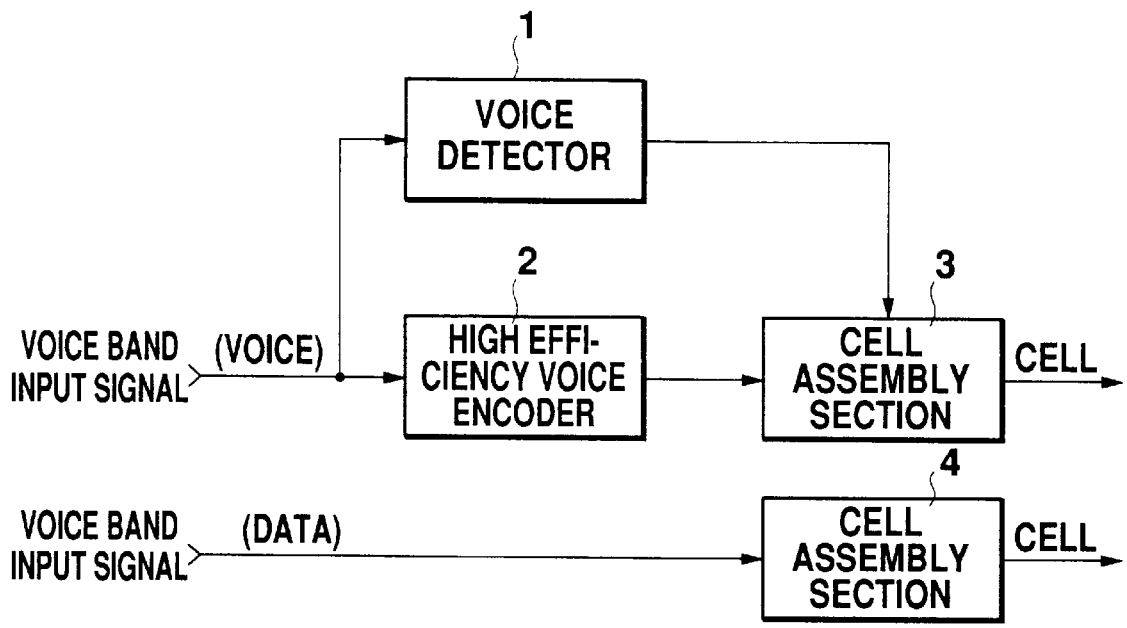
FIG. 1 is a block diagram illustrating a structure of a conventional voice band signal cell assembly apparatus for ATM.

Functions of the voice detector 11, the high efficiency voice encoder 12 and the cell assembly section 13 are the same as those of the corresponding components shown in FIG. 1. The high efficiency voice encoder 12 encodes the input voice to compress the voice. For example, the encoder 12 encodes a 64 kbps PCM signal into a 16 KLD-CELP signal (ITU-T Rec. G. 728). The voice detector 11 discriminates the presence of voice in the input.

The cell assembly section 13 forms cells from the voice which band is compressed by the high efficiency encoder 12. A cell used in ATM is a 53-byte-long signal consisting of 5 bytes of a header and 48 bytes of an information area. The main function of the header is to multiplex or route the cells. The information area incorporates the information used for dividing the signal into voice and data. The cell assembly section 13 sends out an assembled cell onto an ATM transmission channel. At this time, the cell assembly section 13 sends out a cell only when the voice detector 11 detects voice in the voice signal detector 11. This means that if there is silence in the voice signal, no cell is sent out or assembled.

The carrier detector 15 detects the presence or absence of a carrier in data supplied to the apparatus. As can be seen in FIG. 4, which represents a data signal sequence (or a digital signal sequence) input to the carrier detector 15, the data signals are input in the order shown from the left hand side of the figure, where "x" represents a signal having a certain length. The carrier detector 15 detects the presence or absence of the carrier for every N data (eg., from $x_1$ to $x_{1+N-1}$) according to the following discriminants, $$\sum_{i=l}^{l+N-1} \left\{ \sqrt{x_i^2/N} \right\} \geq A \quad (1)$$

$$\sum_{i=l}^{l+N-1} \left\{ \sqrt{x_i^2/N} \right\} < A \quad (2)$$

where "A" indicates a threshold value used for discrimination. If the left term of the expression (1) is equal to or greater than A, the presence of the carrier is determined.

As mentioned before, data represents the signal produced by modulating the carrier to transmit the digital data. The modulated signal includes two alternate parts. One part has a carrier amplitude (effective value), while the other part has none. Sometimes, however, it occurs that the part having no carrier amplitude (effective value) continues for a long period of time because the modulated signal does not include any information to be transmitted. The carrier detector 15 detects this state. If the carrier detector 15 detects no carrier in a given data, it is not necessary to transmit that data as that data includes no information to be transmitted.

The cell assembly section 14 assembles cells from the data supplied from the carrier detector 15. As mentioned before, the length of a cell used in ATM is 53 bytes consisting of 5 bytes of the header and 48 bytes of the information area. The cell assembly section 14 assembles cells only from the data determined to include the carrier in accordance with the determination made by the carrier detector 15. The thus assembled cells are sent out onto the ATM transmission channel. Note that the cell assembly section 15 does not assemble any cells from data in which no carrier is detected.

FIG. 5 shows how the cell assembly section 14 assembles a cell in the cell assembly section 14. The cell assembly section 14 receives the input signals starting from the leftmost signal in the order shown in the figure. Each input signal Y consists of N data samples, that is N data of data x shown in FIG. 4. In FIG. 5, the cell assembly section 14 does not assemble any cells from the input signals preceding to $Y_L$, because the carrier detector 15 already determined the absence of the carrier in those input signals. This is also true for the input signals following $Y_{M-1}$. In the meantime, the carrier detector 15 has determined the presence of the carrier for the signals from $Y_L$ to $Y_{M-1}$. The cell assembly section 14 assembles cells from those input signals and sends out the assembled cells. As a result, (M−L)×N data samples will be included in the cell information area.

The apparatus compresses the voice to ¼ in the high efficiency encoder 12 if the input signal is voice. When silence is detected in the voice signal, the apparatus does not send out a cell. Consequently, the voice is compressed and reduced to ⅛. In the case where the input signal is data, the apparatus does not assemble cells from the data in which no carrier is detected. By doing this, the number of cells formed is reduced by half, with a variation depending on the contents of data. The apparatus thus achieves a high transmission efficiency by way of band compression of both voice and data.

Embodiment 2

Figure 6:
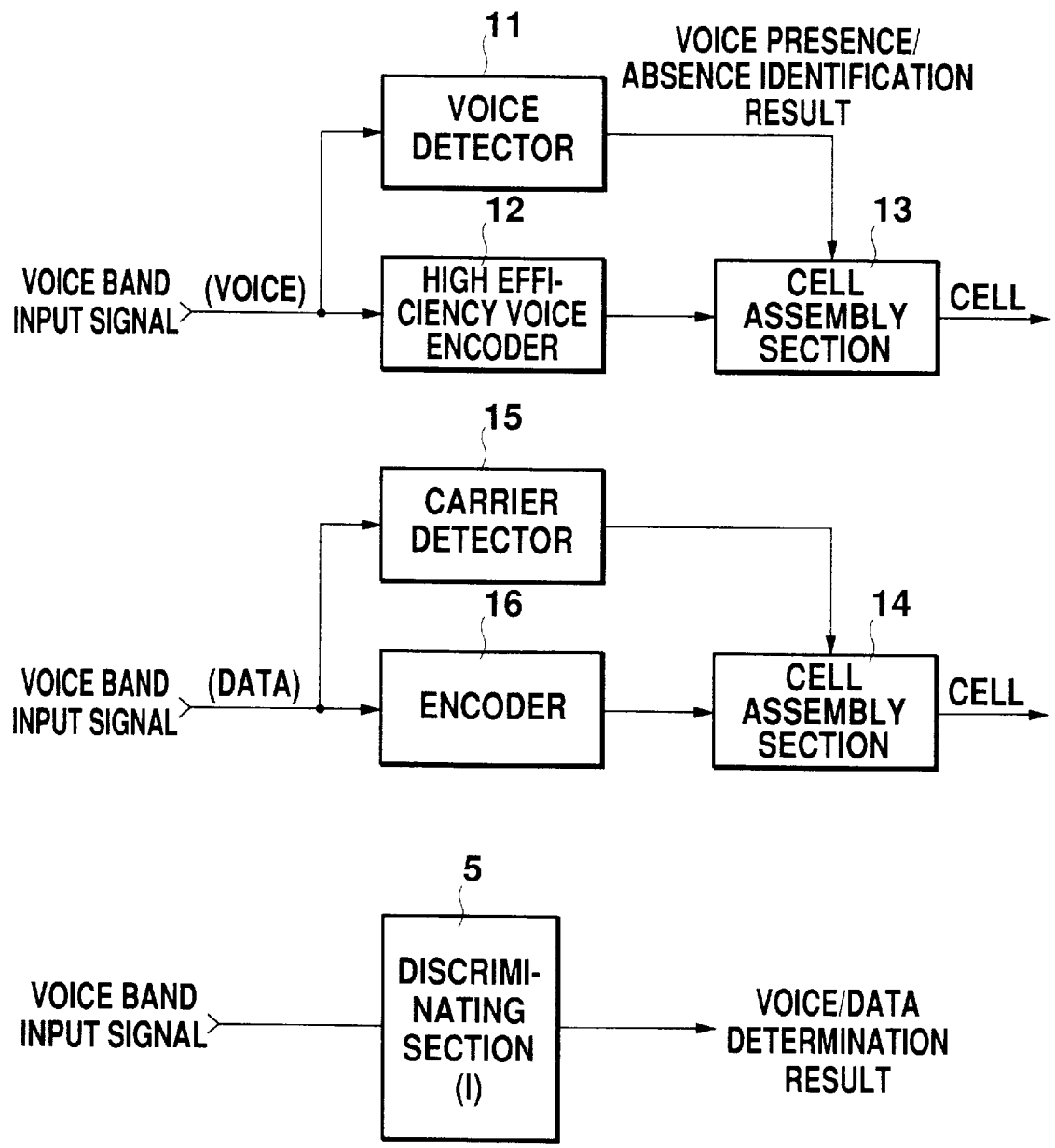
FIGS. 6–12 are block diagrams illustrating ATM voice band signal cell assembly apparatus according to additional preferred embodiments of the present invention.

FIG. 6 shows a second embodiment of the present invention, in which the description of corresponding parts similar to those in the Embodiment 1 will not be repeated. In the Embodiment 1, the voice band signal is supplied directly to the cell assembly section 14 if the signal is data. In contrast to this, an apparatus of this embodiment includes an encoder 16 dedicated to data provided on the input side of the data cell assembly 14. The encoder 16 compresses the band of the input data before the cell assembly section 14 assembles the data into cells.

In this way, the apparatus can carry out cell assembly and transmission at a still higher efficiency. Assume that 32 KADPCM encoding (ITU-T Rec. G. 726) is carried out in the encoder 16, the number of cells formed is further reduced by half compared to the number achieved by the Embodiment 1. In total, the band width is reduced to about ¼ of that of a conventional system.

Embodiment 3

Figure 7:
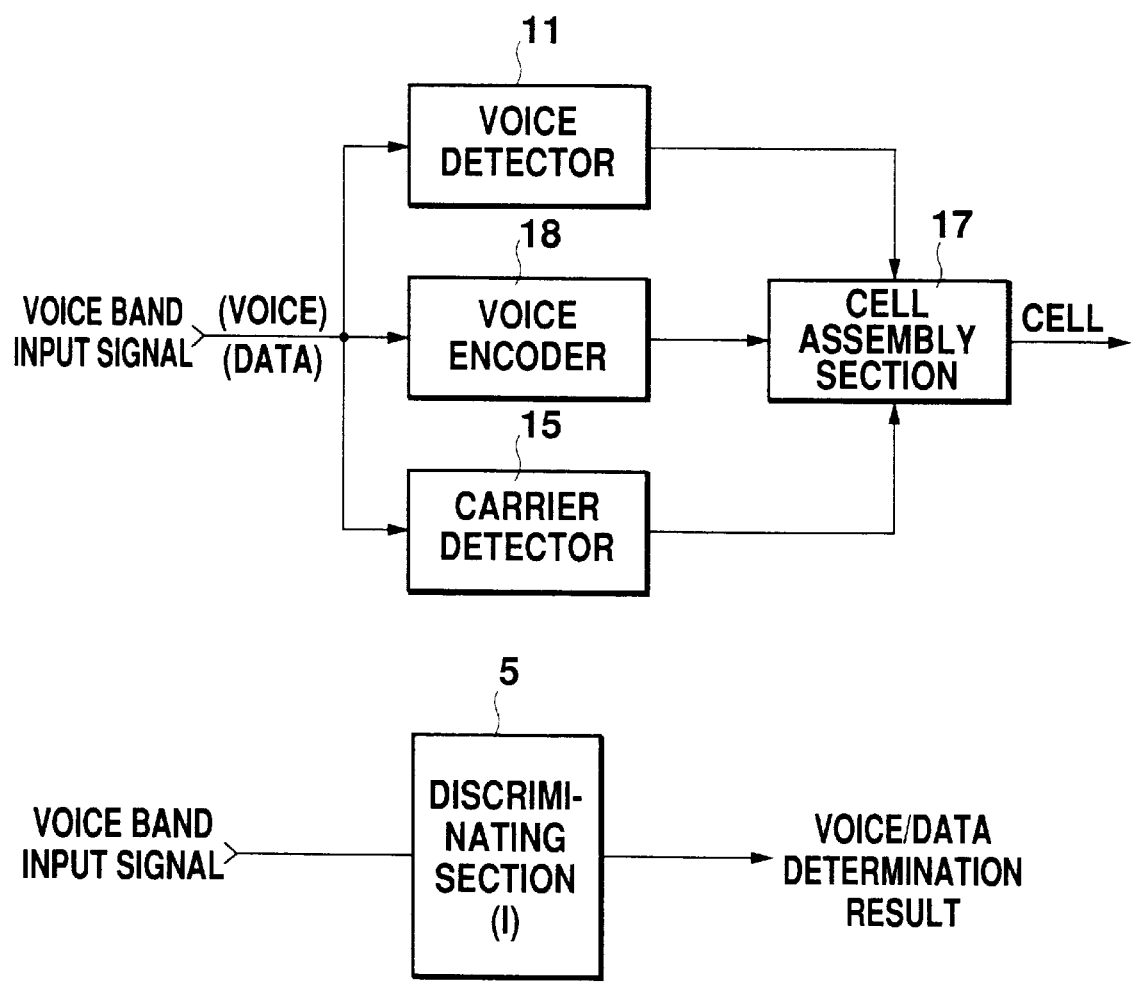

FIG. 7 shows a third embodiment of the present invention, in which the description of corresponding parts similar to those in the Embodiment 2 will not be repeated. In contrast to the apparatus of the Embodiment 2, which includes two encoders, an apparatus of the third embodiment requires only one cell assembly section 17, and a voice encoder 18 formed by a 32 KADPCM encoder. A voice signal is input to the voice detector 11 and the voice encoder 18, while a data signal is input to the carrier detector 15 and the voice encoder 18.

The high efficiency voice encoder 12 of the Embodiment 2 used for the voice band compression is combined with the encoder 16 used for the data band compression. As a result, the apparatus of this embodiment includes only one voice encoder 18. At the same time, the voice cell assembly section 13 and the data cell assembly section 14 of the Embodiment 2 are integrated into one component. The structure of the apparatus is thus simplified by the encoder and the cell assembly section provided for the common use of voice and data.

Embodiment 4

Figure 8:
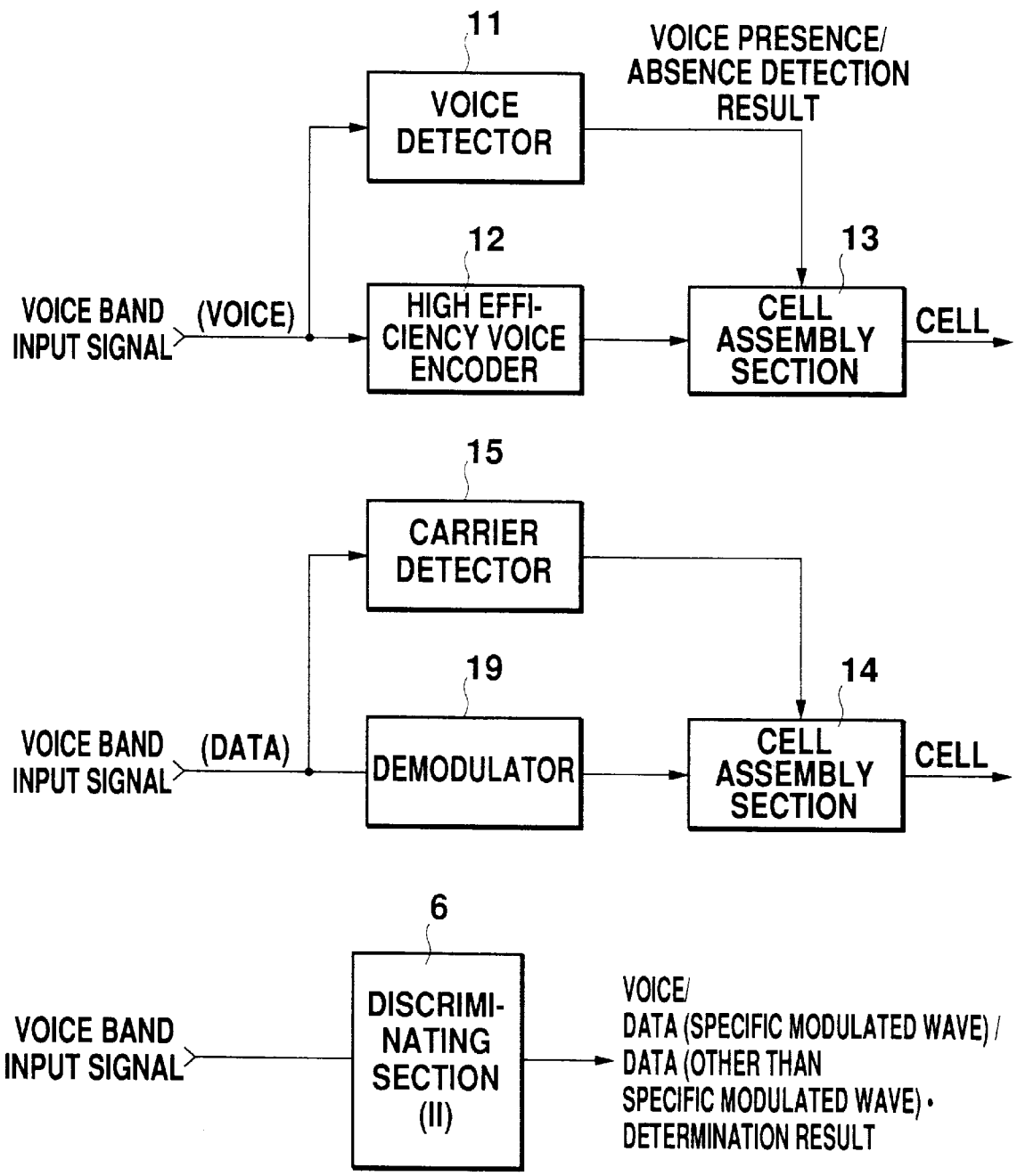

FIG. 8 shows a fourth embodiment of the present invention, in which the description of corresponding parts similar to those in the Embodiment 1 will not be repeated. In the Embodiment 1, the voice band signal is supplied directly to the cell assembly section 14 if the signal is data. In contrast to this, an apparatus of this embodiment includes a demodulator 19 provided on the input side of the data cell assembly section 14. The demodulator 19 reconstitutes the input signal into a baseband signal before the data cell assembly section 14 receives the baseband signal and assembles it into a cell.

Figure 2:
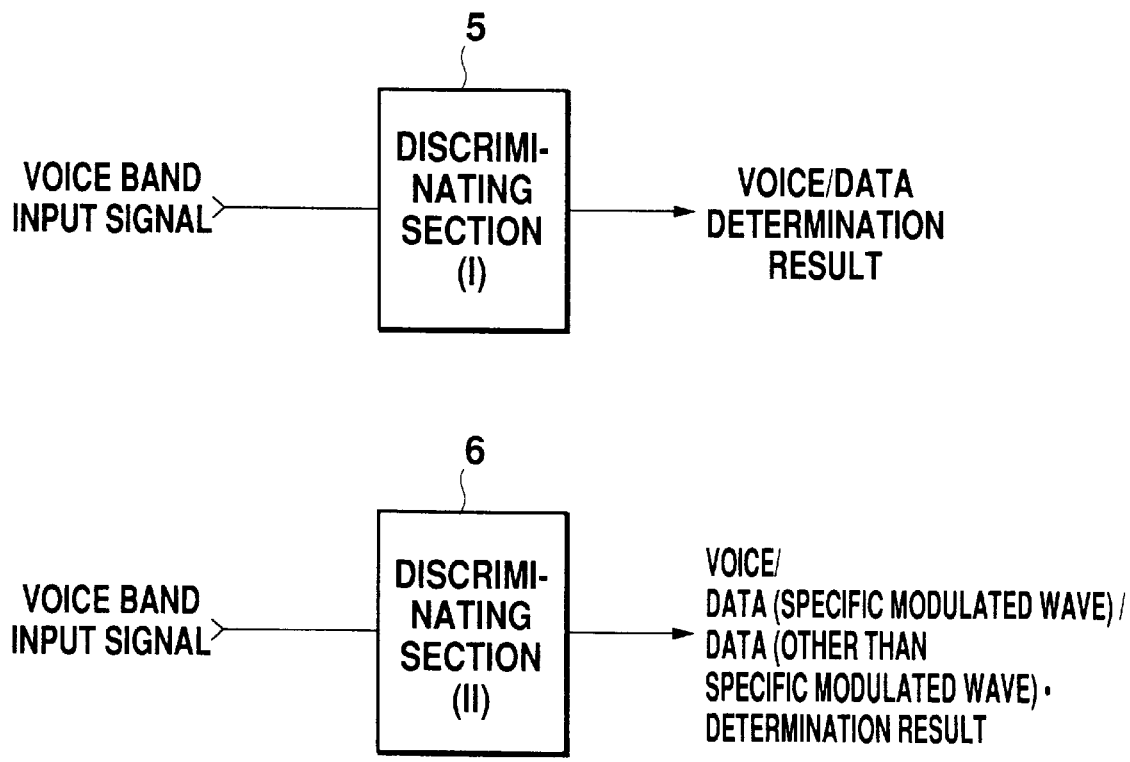
FIG. 2 illustrates a discriminating section used in the present invention as well as in the conventional apparatus.

In this way, the apparatus can carry out the cell assembly and transmission at an almost ideally high efficiency. However, it is not practical in terms of circuit size to demodulate every modulated signal before transmission. The demodulator 19 only demodulates a signal, such as a G3 facsimile signal, which is a specific modulated wave. Discrimination of such data of the specific modulated wave from the other data is carried out by the discriminating section (II) 6 of FIG. 2.

Assuming the demodulator 19 demodulates a 14. 4 kbps G3 facsimile signal, the number of cells formed is reduced to ¼ or less. Consequently, the total number of cells formed is reduced to about ⅛. Having thus reduced the cell number, the apparatus can carry out almost ideal, high efficiency cell assembly and transmission.

Embodiment 5

Figure 9:
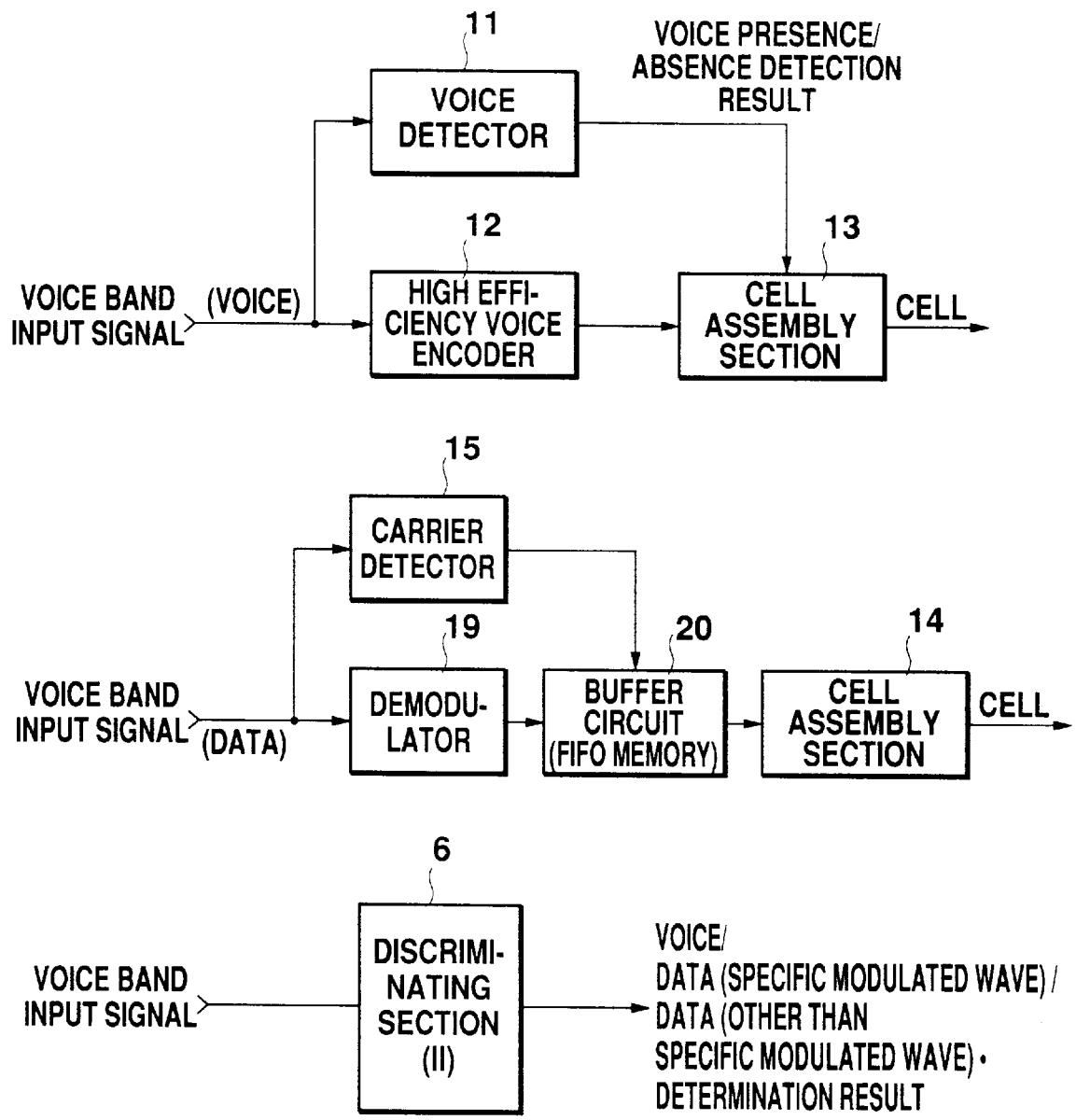

FIG. 9 shows a fifth embodiment of the present invention, in which the description of corresponding parts similar to those in the Embodiment 4 will not be repeated. In the Embodiment 4, since the data cell assembly section 14 controls the carrier detector 15, the carrier detector 15 detects the presence or absence of the carrier including a tone signal if the discriminating section 6 determines that the voice band input signal is data.

In contrast, an apparatus of the fifth embodiment includes a buffer circuit 20 placed between the cell assembly section 14 and the demodulator 19. The buffer circuit 20 is formed by a FIFO memory and has a capacity defined by a demodulated signal length and a maximum deviation of a clock frequency of a demodulated signal relative to network clock frequency. The buffer circuit 20 relieves an asynchronous state between the clock frequency of the demodulated signal and the network clock frequency. The carrier detector 15 controls the buffer circuit 20, instead of the data cell assembly section 14. Thus, the clock frequency of the demodulated signal is not reproduced at the receiver side. Instead, the modulated signal is produced by using the clock which is in synchronism with the network clock frequency.

As such, by simply introducing the buffer circuit 20, it is possible to transmit the demodulating signals in the form of cells even if the clock frequency of the demodulating signal is not in synchronism with the network clock frequency.

Embodiment 6

Figure 10:
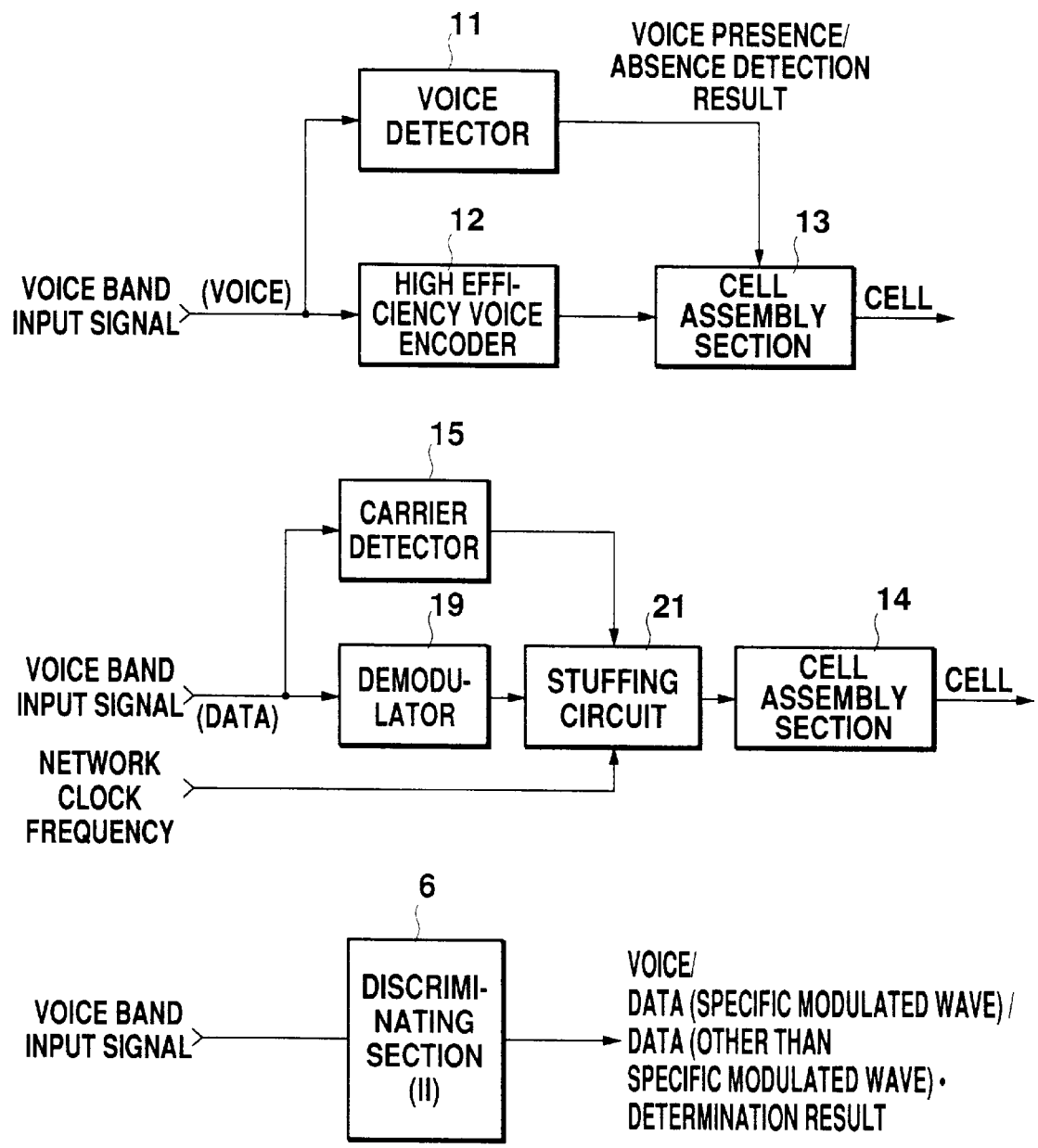

FIG. 10 shows a sixth embodiment of the present invention, in which the description of corresponding parts similar to those in the Embodiment 4 will not be repeated. An apparatus of this embodiment includes a stuffing circuit 21 placed between the cell assembly section 14 and the demodulator 19. The carrier detector 15 controls the stuffing circuit 21 instead of the cell assembly section 14. The stuffing circuit 21 adds a stuff bit to a demodulated signal so as to follow the network clock frequency. The clock frequency of the demodulated signal can be reproduced using the stuff bit on the receiver side.

With this structure, the input signal is assigned with a transmission band wider than the clock frequency of the input signal if the clock frequency of the input signal is asynchronous with the clock frequency of the transmission network. As such, it is possible to transmit the input signal whose clock frequency is not synchronous. The thus transmitted signal includes a true input signal, a padding signal, and a control signal (i.e., information for distinguishing between the true signal and the padding signal.) The stuffing circuit 21 adds and deletes a stuff bit, which is used for padding and controlling, so as to transmit the true signal.

Thus, the apparatus of this embodiment can relieve the inconvenience faced by the Embodiment 4, i.e., the asynchronous state between the demodulated clock frequency and the network clock frequency. The apparatus also achieves the cell assembly and transmission more reliable than the Embodiment 5.

Embodiment 7

Figure 11:
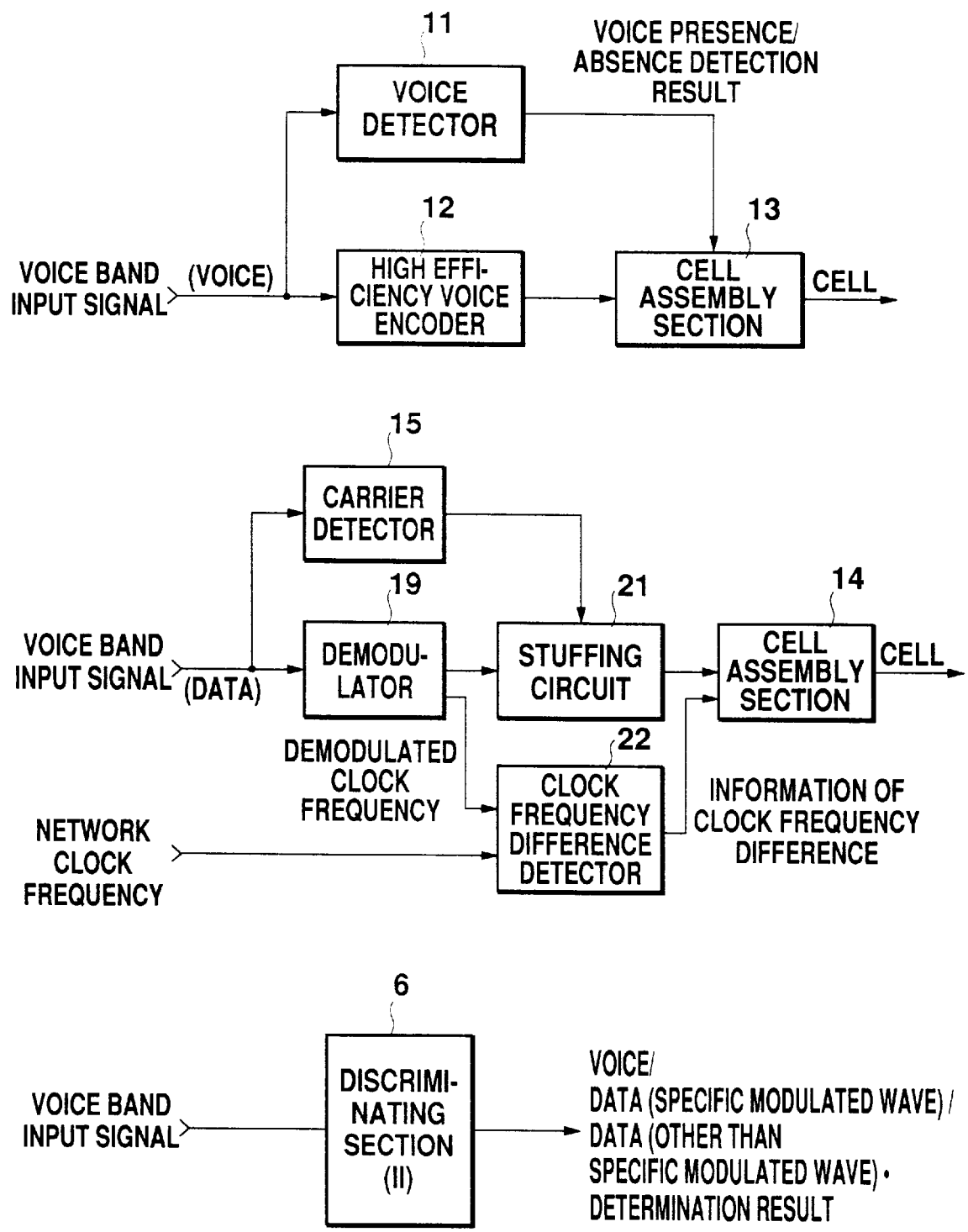

FIG. 11 shows a seventh embodiment of the present invention, in which the description of corresponding parts similar to those in the Embodiment 6 will not be repeated. An apparatus of this embodiment includes a clock frequency difference detector 22 connected in series with the stuffing circuit 21 between the cell assembly section 14 and the demodulator 19. The clock frequency difference detector 22 receives a demodulated clock frequency and the network clock frequency, calculates clock difference information based on the input information, and supplies the clock difference information to the cell assembly section 14.

The apparatus of this embodiment transmits cells at a CBR (Constant Bit Rate) for a certain period of time when carrier presence is detected. During transmission, the clock difference information is stored in the header of an AAL (ATM Adaptation Layer) such as the AAL Type I. At the receiver side, the demodulated clock is reproduced in accordance with the information stored in the header. The apparatus improves the performance of reproducing the demodulated clock frequency compared to that of the Embodiment 6.

Embodiment 8

In the Embodiments 6 and 7, the carrier detector 15 is connected to the stuffing circuit 21. The carrier detector 15 detects the presence or absence of the carrier in the input signal, and controls the stuffing circuit 21 based on the detection result. In contrast to this, an apparatus of an eighth embodiment of the present invention includes the carrier detector 15 connected to the cell assembly section 14. The cell assembly section 14 is controlled in accordance with the detection result of the carrier detector 15. This structure is advantageous in minimizing cell assembly delay.

Embodiment 9

Figure 12:
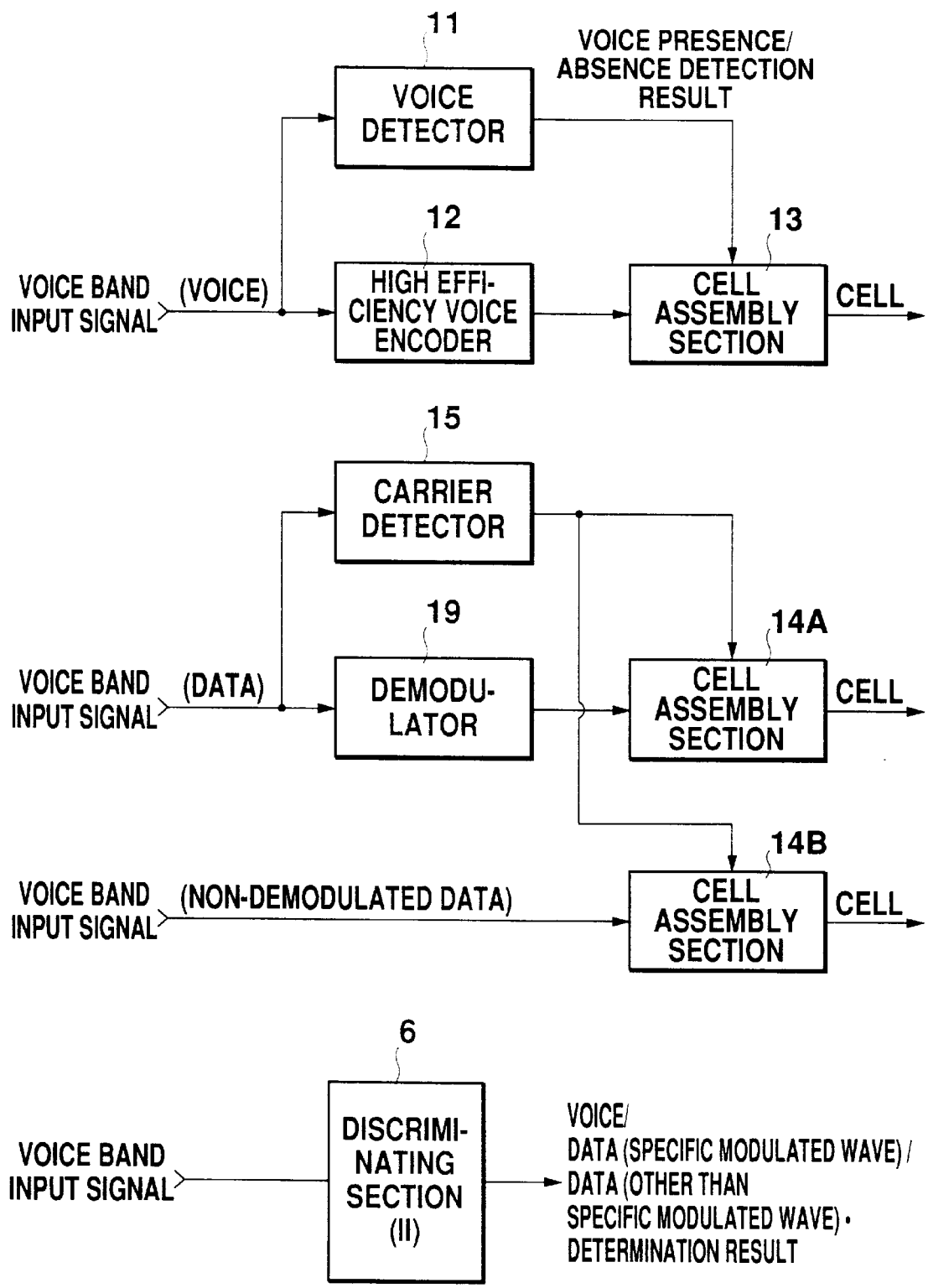

FIG. 12 shows a ninth embodiment of the present invention, in which the description will not be repeated for the corresponding parts similar to those in the Embodiment 4. An apparatus shown in FIG. 12 includes two cell assembly sections 14A and 14B for assembling data into cells.

A discriminating section (II) 6 distinguishes whether the voice band input signal is voice, data of a specific modulated wave, or data of a modulated wave other than the specific modulated wave. The data of the specific modulated wave refers to the G3 facsimile signal, for example.

When the discriminating section (II) 6 determines the input signal is data of the specific modulated wave, the data is input to the carrier detector 15 and the demodulator 19. The demodulator 19 then demodulates the data signal and supplies the demodulated data signal to the cell assembly section 14A. The carrier detector 15 detects the presence or absence of the carrier in the demodulated signal and supplies the detection result to the cell assembly section 14A.

When the discriminating section (II) 6 determines the input signal is data of the modulated wave other than the specific modulated wave, the data is directly input to the cell assembly section 14B without demodulation, and also to the carrier detector 15. The carrier detector 15 detects the presence or absence of the carrier in the data signal and supplies the detection result to the cell assembly section 14B.

With this structure, the apparatus selects the cell assembly method depending of how the input signal is modulated. In other words, if the input signal is data of the specific modulated wave, the apparatus demodulates the input signal before assembling the signal into the cell. On the other hand, if the input signal is data of the modulated wave other than the specific modulated wave, the apparatus assembles the cell from the input signal without demodulating it. Thus, the apparatus can transmit all the data within the voice band, and achieve an almost ideally high transmission efficiency in the transmission of the data such as the G3 facsimile signal of the specific modulated wave.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A cell assembly apparatus for a voice band signal used in ATM (Asynchronous Transfer Mode), comprising:

a discriminating section for determining whether an incoming voice band signal is voice or data;

a high efficiency voice encoder for compressing a band of voice when said discriminating section determines that the voice band signal is voice;

a voice detector for detecting the presence or absence of voice in said voice band signal;

a voice cell assembly section for prohibiting supply of a cell when said voice detector detects the absence of voice in said voice band signal;

a carrier detector for detecting the presence or absence of a carrier including a tone signal when said discriminating section determines that the voice band signal is data; and a data cell assembly section for prohibiting supply of a cell when said carrier detector detects the absence of the carrier.

2. A cell assembly apparatus for a voice band signal used in ATM according to claim 1, wherein an encoder is provided on an input side of said data cell assembly section for compressing the data when said discriminating section determines that said voice band signal is data.

3. A cell assembly apparatus for a voice band signal used in ATM according to claim 2, wherein said encoder for compressing the data is a voice encoder capable of transmitting desired data, said high efficiency voice encoder for compressing the voice is combined with said encoder for compressing the data, and wherein said voice and data cell assembly sections are integrated into one component.

4. A cell assembly apparatus for a voice band signal used in ATM according to claim 1, wherein said discriminating section has a function to determine whether the data is a specific modulated wave or a modulated wave other than the specific modulated wave, and wherein a demodulator is provided on an input side of said data cell assembly section in order to retrieve a baseband signal of the data of said specific modulated wave if said discriminating section determines that said voice band signal is data of said specific modulated wave.

5. A cell assembly apparatus for a voice band signal used in ATM according to claim 4, wherein a buffer circuit, whose capacity is defined by a demodulated signal length and a maximum deviation of a clock frequency of a demodulated signal relative to network clock frequency, is provided on the transmitter side between said data cell assembly section and said demodulator for relieving an asynchronous state between a clock frequency of a demodulated signal and a network clock frequency, said buffer circuit being controlled by said carrier detector.

6. A cell assembly apparatus for a voice band signal used in ATM according to claim 4, wherein a stuffing circuit is provided between said data cell assembly section and said demodulator for relieving an asynchronous state between a clock frequency of a demodulated signal and a network clock frequency, either of said stuffing circuit and said data cell assembly section being controlled by said carrier detector.

7. A cell assembly apparatus for a voice band signal used in ATM according to claim 6, wherein a clock frequency difference detector is provided between said data cell assembly section and said demodulator for receiving information about clock difference between a clock frequency of a demodulated signal and a network clock frequency to relieve an asynchronous state between those two clock frequencies, said cell assembly section for the data having a function of transmitting said clock difference information by placing the information in a header of an ATM adaptation layer of a cell.

8. A cell assembly apparatus for a voice band signal used in ATM according to claim 4, wherein said cell assembly section for the data consists of two cell assembly sections, one cell assembly section receiving an output of said carrier detector and a data signal demodulated by said demodulator, and the other receiving an output of said carrier detector and a non-demodulated data signal, whereby the input signal is subjected to demodulation prior to cell assembly by said one cell assembly section in the case of the input signal of said specific modulated wave, while the input signal is assembled into a cell by said the other assembly section without demodulation in the case of the input signal of said modulated wave other than said specific modulated wave.

9. A cell assembly apparatus for a voice band signal used in Asynchronous Transfer Mode for assembling a cell from data carried in a voice band signal, comprising:

a carrier detector for detecting the presence or absence of a carrier in said data; and a cell assembly section for assembling and transmitting a cell from the data only in which the carrier detector detects presence of the carrier.

* * * * *